March 16, 1937. A. MAURER 2,073,846

WEDGE SHAPED POWER TRANSMITTING MEMBER

Filed May 27, 1931

Inventor:
Albrecht Maurer
by Karl Kirkauer
Atty.

Patented Mar. 16, 1937

2,073,846

UNITED STATES PATENT OFFICE 2,073,846

WEDGE SHAPED POWER TRANSMITTING MEMBER

Albrecht Maurer, Bad Homburg vor der Hohe, Germany, assignor to Link-Belt Company, Chicago, Ill., a corporation of Illinois Application May 27, 1931, Serial No. 540,327
In Germany September 19, 1929

12 Claims. (Cl. 74—231)

My invention relates to wedge-shaped power transmitting members such as belts.

It is an object of my invention to improve a member of the kind referred to. To this end instead of the usual engaging elements of soft material by which the belt engages the pulley, I provide engaging elements of a material possessing high elasticity and high hardness, preferably hardened steel.

In the drawing affixed to this specification and forming part thereof my invention as applied to a link belt is illustrated diagrammatically by way of example.

In the drawing

Figure 1:
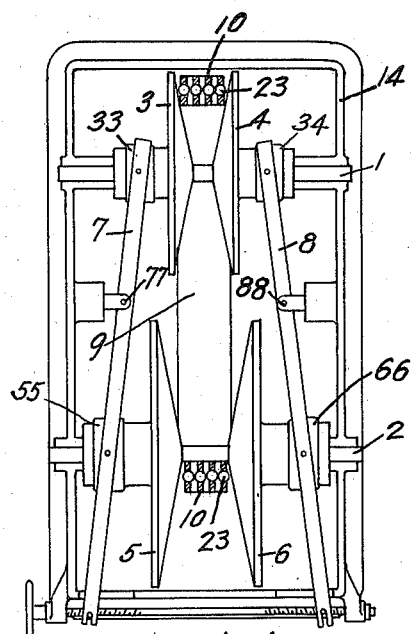
Fig. 1 is a plan view of a pair of pulleys and a link belt connecting them, with engaging elements inserted in its links and projecting from both sides of the belt with their pulley-engaging faces.

Referring now to the drawing, and first to Fig. 1, 1 is the driving shaft, 2 is the driven shaft, and 3, 4 and 5, 6 are pairs of cone pulleys on the shafts 1 and 2, respectively. The pulleys are mounted to slide on their shafts. 7, 8 are double-armed levers which are fulcrumed at 77 and 88, respectively, and with their free ends are connected to rings 33, 34 and 55, 66 on the bosses of the respective pulleys so as to vary the effective diameter of the pulleys. 9 is a belt on the pulleys, 10 are the links of the belt, and 23 are engaging elements inserted in the links.

Heretofore the engaging elements of wedge-shaped power transmitting members were made of soft material, or equipped with linings of soft material at their pulley-engaging ends, with a view to increasing the friction. Materials usually employed are leather, rubber, fibre, wood, and similar comparatively soft substances. Soft materials must be subjected to comparatively low pressure and must be made rather large in order to distribute the pressure. This condition results in large diameters of the pulleys and large pitch of the engaging elements. The speed limit for the member is a function of the pitch, for the larger the pitch the higher the relative velocity at which the engaging elements engage the faces of the pulleys. The relative velocity must not overstep a certain limit with consideration of the softness of the engaging elements, and this in turn limits the speed of the belt to a comparatively low amount.

Heretofore the wedge-shaped power transmitting members were arranged with their pulley-engaging faces at a large angle. The consequence is that the relative velocity at which the engaging elements engage the faces of the pulleys has a large component at right angles to the faces and therefore the shocks against the faces are considerable. This again limits the belt speed as otherwise the shocks would become too severe. The softness of the materials heretofore employed for the engaging elements causes great deformations and considerable creeping of the engaging elements as they seat on the faces of the pulleys. This not only deteriorates the efficiency but also causes heating of the parts and excessive wear, sometimes even coking, of the engaging elements. In view of all these limitations resulting from the character of the materials employed for the engaging elements, the power which can be transmitted is very low.

Another drawback of the engaging elements as designed heretofore is that they must run in air on account of their properties, and are not only subjected to atmospheric influences so that their friction is varied by the varying moisture and other atmospheric factors, but also are exposed to the access of foreign matter, for instance coal dust which acts as a lubricant. The variations caused by such influences of the ambient air and the matter suspended therein are very important and it may happen that the operating conditions undergo a complete change during the operation of the member.

All these drawbacks are eliminated according to the present invention by providing engaging elements of a material, such as steel, with high elasticity and high hardness. Engaging elements of hardened steel or the like undergo only very slight deformation under the power-transmitting pressure and the creeping of the engaging elements when wedging themselves in between the pulleys 3, 4 and 5, 6 is very small. The angle of the wedge faces which is equal to the angle of the pulley faces, related to a line at right angles to the axis of the pulleys, may be so determined that its tangent is equal, or substantially equal, to the friction coefficient of the engaging elements and the pulleys. If this is so the power required for releasing the frictional connection becomes nil. As the friction coefficient for metal on metal is low the angle of the pulley-engaging friction faces at the ends of the engaging elements becomes small in proportion and the component of the relative velocity at right angles to the friction faces is very much reduced, and so are the shocks resulting therefrom.

As the pressure per unit of area may be much higher in the hard material employed according to the present invention than in the soft materials employed heretofore, the size of the engaging elements is very much reduced, involving a correspondingly small pitch and correspondingly small diameters of the pulleys. These conditions in turn reduce the relative velocity which, as explained, limits the belt speed so that higher speeds are obtained with the hard engaging elements.

The efficiency is increased by the aforesaid favorable conditions, and it is further increased by the reduction of creeping and wear.

In view of the aforesaid advantages the power-transmitting mechanism according to the present invention combines higher output and smaller size, as compared with the old mechanisms referred to.

Atmospheric and other disturbing influences may be kept out, for instance, by running the mechanism in an oil bath as indicated at 14 in Fig. 1, so as to maintain the friction coefficient constant for any period of operation.

Figure 2:
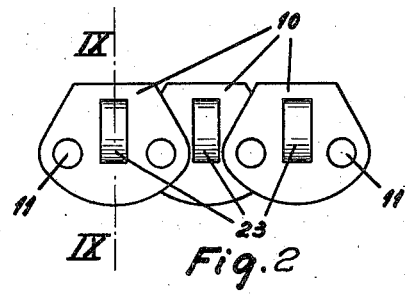
Fig. 2 is an elevation.
Figure 3:
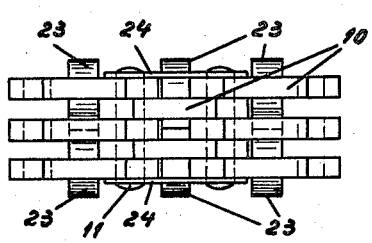
Fig. 3 is a plan view.
Figure 4:
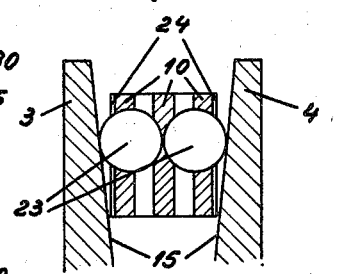
Fig. 4 is a section on the lines IX—IX in Fig. 2, showing a belt in which the engaging elements are designed as antifriction members inserted in the links.

Referring first to Figs. 2 to 4, 10 are links, 11 are bolts connecting them, and 23 are rollers inserted in suitable seats of the links, with their axes extending in parallel to the longitudinal axis of the chain, and their treads projecting from the sides of the links and engaging the pulley faces 15, 15, Fig. 4. The rollers 23 are in contact with each other in the longitudinal axis of the chain and are retained in the outer links 10 by slotted plates 24. Instead of providing retaining plates the roller seats in the links themselves may be so designed as to retain the rollers but this involves the drawback that it is necessary to take apart several links if a roller requires exchanging. Instead of rollers, balls might be provided, or the treads of the rollers might be rounded spherically.

Figure 5:
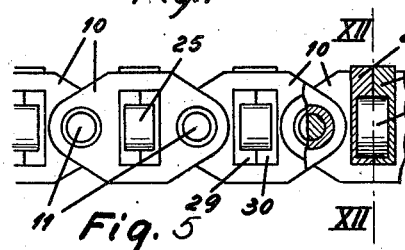
Fig. 5 is a partly sectional elevation.
Figure 6:
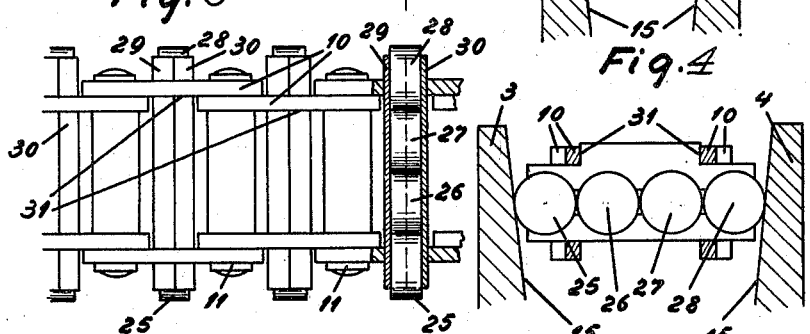
Fig. 6 is a partly sectional plan view.
Figure 7:
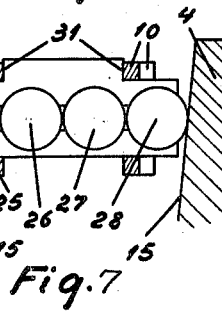
Fig. 7 is a section on the line XII—XII in Fig. 5 showing a link belt with cages for the antifriction members.

Instead of mounting the rollers or balls directly in the links as shown in Figs. 2 to 4, they may be mounted in cages extending transversely to the member, as shown in Figs. 5 to 7, in which four interengaging rollers 25, 26, 27 and 28 are inserted in each cage, with the rollers 25, 28 at the outer ends of each row projecting from the ends of the cage and engaging the faces 15 of the pulleys. The roller cages 29, 30 are divided longitudinally and inserted in the links 10 intermediate the bolts 11, with their parts held assembled by the links. The outer ends of the cages are off-set as at 31 and inserted in holes of the links 10 from which they project at opposite sides as best seen in Fig. 7. Obviously the cages might be off-set at their upper and lower edges instead of being off-set at the upper edges only, as shown. The cages are firmly held in the links and cannot move out of the chain.

Obviously any number of anti-friction elements 23 or 25 to 28, with or without cages, may be provided, and they may be rollers, spheres or rollers having spherical treads.

I wish it to be understood that I do not desire to be limited to the exact details of construction shown and described for obvious modifications will occur to a person skilled in the art.

With particular reference to the forms of the invention shown in Figures 2 to 7, inclusive, it is to be noted that sliding friction between the belt and the pulley faces during the radial inward and outward movement of the engaging elements of the belt between the pairs of cones is eliminated by reason of the fact that each pulley engaging member carried by the belt is composed of a plurality of rolling bodies whose axes preferably lie along the longitudinal direction of the belt and which are arranged for relative rolling movement against each other and which have projecting portions which project from the belt and engage the pulley surfaces. The friction along the line of the belt, that is to say, the driving or driven friction between the belt and the pulleys, which is necessary for the transmission of power, is not reduced but is increased by this construction; but radial friction during radial movement of the belt and pulley is reduced and a deeper wedging of the pulley engaging members is made possible. The self-acting roller members absorb the side pressure of the pulleys without sidewise loading or bending of the belt itself. The rotating parts are so positioned in the belt that each is free to rotate about an axis lying generally in the longitudinal direction of the belt. In this connection it makes no difference whether the rollers are mounted directly in the belt or in a guide or cage or case fastened within the belt or carried by the belt. During the radial or inward or outward movement of the belt with respect to the pulleys, the rolling members roll upon the pulley surfaces as well as upon each other and thus there is no sliding friction and thus wear of the parts is reduced and the life of the parts is increased.

I claim:—

1. A power transmitting chain comprising links and pulley-engaging and interengaging anti-friction elements of resilient and hard material projecting from the sides of said links said pulley-engaging elements mounted to move normally freely with respect to the body of the chain and being in contact with each other.

2. A power transmitting chain comprising links, divided cages in said links, and pulley-engaging anti-friction elements in said cages and projecting from opposite ends thereof said pulley-engaging elements mounted to move normally freely with respect to the body of the chain and being in contact with each other.

3. A drive belt adapted to engage driving discs and comprising links and pulley-engaging friction elements projecting from said links, said elements consisting of a plurality of bodies which are capable of rolling, which are in contact with one another and which bear against the surfaces of the driving discs.

4. A drive belt adapted to engage driving discs and comprising links and pulley-engaging friction elements projecting from said links, said elements consisting of a plurality of bodies which are capable of rolling about axes lying in the longitudinal direction of the belt, which are in contact with one another and which bear against the surfaces of the driving discs.

5. A drive belt adapted to engage driving discs and comprising links and pulley-engaging friction elements projecting from said links, said elements consisting of a plurality of bodies in contact with each other which are capable of rolling each about a fixed axis and which bear against the surfaces of the driving discs and project out of the belt links, the bodies being of cylindrical shape, and which form the sole contact between the belt and the driving disc.

6. A drive belt adapted to engage driving discs and comprising links and pulley-engaging friction elements projecting from said links, said elements consisting of a plurality of bodies which are capable of rolling about axes lying in the longitudinal direction of the belt, which are in contact with one another, and which bear against the surfaces of the driving discs and project out of the belt links, the bodies being of cylindrical shape.

7. A drive belt adapted to engage driving discs and comprising links and pulley-engaging friction elements projecting from said links, said elements consisting of a plurality of bodies which are capable of rolling, which are in contact with one another and which bear against the surfaces of the driving discs, the bodies being of spherical shape.

8. A drive belt adapted to engage driving discs and comprising links and pulley-engaging friction elements projecting from said links, said elements consisting of a plurality of bodies which are capable of rolling about axes lying in the longitudinal direction of the belt, which are in contact with one another, and which bear against the conical surfaces of the driving discs and project out of the belt links, the bodies being of spherical shape.

9. A drive belt adapted to engage driving discs and comprising links and pulley-engaging friction elements projecting from the sides of said links, said elements consisting of a plurality of bodies which are capable of rolling about axes lying in the longitudinal direction of the belt, which are in contact with one another, and which bear against the conical surfaces of the driving discs with the circumference projecting out of the belt links, and a special cage fixed in the said links transverse to the direction of pull, and carrying said bodies capable of rolling.

10. A drive belt adapted to engage driving discs and comprising links and pulley-engaging friction elements projecting from the sides of said links, said elements consisting of a plurality of bodies which are capable of rolling about axes lying in the longitudinal direction of the belt, which are in contact with one another, and which bear against the conical surfaces of the driving discs with the circumference projecting out of the belt links, and a special cage divided into parts, these parts being kept together by the said links, said cage containing said bodies.

11. A power transmitting member comprising links and pulley engaging cylindrical anti-friction elements mounted for free rotation about axes fixed with respect to said member and formed of resilient and hard material projecting from the sides of said links.

12. A power transmitting member comprising links and pulley engaging anti-friction elements of resilient and hard material projecting from the sides of said links, said elements being revolution bodies mounted for free rotation with their axes fixed with respect to said member and arranged in parallel to the longitudinal axes of said member.

ALBRECHT MAURER.